United States Patent
Maleck

(10) Patent No.: US 6,801,541 B1
(45) Date of Patent: Oct. 5, 2004

(54) METHOD AND APPARATUS FOR DATA TRANSMISSION OVER AN AC-97 PROTOCOL LINK

(75) Inventor: Timothy C. Maleck, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 810 days.

(21) Appl. No.: 09/675,292

(22) Filed: Sep. 29, 2000

(51) Int. Cl.[7] .................................................. H04J 3/16
(52) U.S. Cl. ......................... 370/466; 710/104; 439/43
(58) Field of Search .................................. 370/466, 479, 370/490, 522; 379/142.15, 93.05; 710/301, 20, 104; 700/94, 1, 61–65, 21, 13; 712/36, 229, 225; 375/220–225

(56) References Cited

U.S. PATENT DOCUMENTS

| | | | | |
|---|---|---|---|---|
| 6,007,228 A | * | 12/1999 | Agarwal et al. | 700/94 |
| 6,055,619 A | * | 4/2000 | North et al. | 712/36 |
| 6,088,748 A | | 7/2000 | Gulick | 710/100 |
| 6,128,317 A | * | 10/2000 | Mackre | 370/479 |
| 6,259,957 B1 | * | 7/2001 | Alexander et al. | 700/94 |
| 6,345,072 B1 | * | 2/2002 | Liu et al. | 375/222 |
| 6,347,344 B1 | * | 2/2002 | Baker et al. | 710/20 |
| 6,510,215 B1 | * | 1/2003 | Hendrickson | 379/142.15 |
| 6,572,384 B1 | * | 6/2003 | Marchevsky | 439/43 |
| 6,647,451 B1 | * | 11/2003 | Barmore | 710/301 |

FOREIGN PATENT DOCUMENTS

| | | |
|---|---|---|
| GB | 2323000 A | 9/1998 |
| JP | 11275034 | 8/1999 |
| WO | WO 00/19308 | 4/2000 |

* cited by examiner

*Primary Examiner*—Chi Pham
*Assistant Examiner*—Prenell Jones
(74) *Attorney, Agent, or Firm*—Kelly K. Kordzik; Winstead Sechrest & Minick P.C.

(57) ABSTRACT

An Audio Encoder/Decoder (AC)-97 protocol link is used for concurrent data communication between AC-97 protocol devices and non-AC-97 protocol devices. The Tag data in an AC-97 data frame is used to select specific CODECs and to determine which data time slots to ignore or accept. Since telephone voice and data communication uses only the Tag data and one other of the data frame time slots, eleven slots are available for communication using non-AC-97 protocol devices concurrent with telephony communications. Ethernet, Home Phoneline Network Alliance (HPNA), Attachment Unit Interface (AUI) are some of the data communication protocols that may be employed using embodiments of the present invention. An AC-97 data communication controller may modified with additional logic and control lines to support additional features of non-AC-97 protocol devices.

44 Claims, 6 Drawing Sheets

Currently Defined AC97 Slot Assignments

AC97 Slot Assignment for Ethernet Packets
Hatched slots are used for Ethernet Traffic Physical AMR Connector and Signals Used Audio Shield (back of system)

| | | | |
|---|---|---|---|
| B1 | Audio Mute# | Audio_PWRDN | A1 |
| B2 | GND | *MONO_PHONE* | A2 |
| B3 | MONO_OUT/PC_BeeP | **RESERVED | A3 |
| B4 | ** RESERVED | ** RESERVED | A4 |
| B5 | ** RESERVED | ** RESERVED | A5 |
| B6 | *Primary_DN#* | GND | A6 |
| B7 | -12V | +5V dual/+5V SB | A7 |
| B8 | *GND* | USB_OC# | A8 |
| B9 | +12V | GND | A9 |
| B10 | GND | USB+ | A10 |
| B11 | +5V Digital | USB- | A11 |
| | KEYWAY | KEYWAY | |
| | KEYWAY | KEYWAY | |
| B12 | GND | GND | A12 |
| B13 | ** RESERVED | S/P-DIF-IN | A13 |
| B14 | ** RESERVED | GND | A14 |
| B15 | +3.3v Digital | +3.3v dual/+3.3v SB | A15 |
| B16 | GND | GND | A16 |
| B17 | *AC97_SDATA_OUT* | *AC97_SYNC* | A17 |
| B18 | *AC97_RESET* | GND | A18 |
| B18 | *AC97_SDATA_IN3* | *AC97_SDATA_IN1* | A19 |
| B20 | GND | GND | A20 |
| B21 | *AC97_SDATA_IN2* | *AC97_SDATA_IN0* | A21 |
| B22 | GND | GND | A22 |
| B23 | *AC97-MSTRCLK* | *AC97__BITCLK* | A23 |

*\* Signals used in typical modem card not specifically called for in the AC97 spec*

\*\* Signals used in sypical modem card that are called for in the AC97 spec.

FIG. 3

METHOD AND APPARATUS FOR DATA TRANSMISSION OVER AN AC-97 PROTOCOL LINK

TECHNICAL FIELD

The present invention relates in general to data processing systems, and in particular, to data transmission over an Audio Encoder/Decoder (AC)-97 protocol data link using both AC-97 protocol and non-AC-97 protocol devices.

BACKGROUND INFORMATION

In considerations during computer system design, it is becoming increasingly common in all market segments of the home and business PC industry to use both Register Jack (RJ)11 telephone line and standard RJ45 connection schemes for data and Ethernet transmissions. Another major consideration in the design of Personal Computer (PC) systems is resource consumption. With more items being added to increase the usability and connectivity of the PC, available resources (I/O addresses, interrupt request/ knowledge, Direct Memory Access (DMA) channels, etc.) within the PC are harder to find.

PC manufacturers are always looking for ways to lower the cost of computers they sell. Host signal processing is one of the cost saving measures which is being extensively used. As processor speed increases, tasks that used to be handled in separate (and expensive) stand alone devices, are being done by the main system processor. Simple, low-cost interface devices are used for Input/Output (I/O), Analog to Digital (AD) and Digital to Analog (DA) functions. Integrating functions into the main processor lowers overall system cost, but processing of these functions still requires system resources.

To deal with the problems that arise when functions are integrated, manufacturers have developed interface data communications standards. One standard has emerged which many manufacturers use to address some of these design issues. The AC-97/Audio Modem Riser (AMR) specification, authored by Intel, allows multiple audio and modem devices to be present in a system while using only one set of system resources. The AC-97/AMR standard employs a Time Division Multiplexing (TDM) scheme with a stated maximum data rate well below that needed even for one megabit Ethernet traffic. Communication using the AC-97 specification supports the use of multiple data streams, so it is possible to have a sound card device and a "v.90" (standard for communicating 56 Kbps upstream and 32.6 Kbps downstream) modem operating at the same time. If a separate data connection is present (e.g., Home Phoneline Network Alliance (HPNA), G. Lite, or a standard 10BaseT interface), communication using these protocols may operate together within the functionality of the AC-97 specification. Multiple data streams, operating concurrently, are considered a "normal" functionality in AC-97 so any attempt at a new communication solution within AC-97 must allow at least the same level of simultaneous operation.

Presently many PC/motherboard manufacturers are offering some of (if not all) the AC-97 features integrated onto the system motherboard. The AC-97/AMR link is defined as a motherboard resource in the Intel AC-97 specification and not a user/field connection. This allows the motherboard designers complete control of resource assignments and allows multiple feature levels, depending on the performance and price targets of the design. Since AC-97 and the AMR connector are motherboard resources, non-standard functions may be implemented without any additional customer or field support problems. Additional customer or field support problems may be reduced because once the PC is in the field, the functions of the devices are transparent to the user. The drivers are included in the operating system by the Other Equipment Manufacturer (OEM), so no additional support is required. A more traditional approach for modifying or changing communication functionality, where the user adds modems and network cards, creates a lot of support issues directly related to resource allocation and conflicts. Some OEMs indicate that add on modems and network cards are responsible for more than fifty percent of the technical support calls taken every year. As the preceding illustrates, resource shortages, software device driver conflicts, and high system cost are all challenges facing today's PC and motherboard designers.

The AMR connector using the AC-97 protocol is becoming more common. The AMR connector is used primarily as a modem port, giving the system a simple digital interface for a "v.90" implementation. All the signal processing is done on the host processor and the sensitive analog components reside on an add-in AMR card. The sound card functions are increasingly done on the motherboard, so that it may not be necessary for the AC-97 link to carry sound information. Embodiments of the present invention address some of the stated issues of the AMR based data/Ethernet design in a new and effective way.

SUMMARY OF THE INVENTION

The present invention employs features of the AC-97 specification to enable a novel data communication system. The Time Division Multiplexed (TDM) data frame employed in AC-97 protocol devices has time slots that are unused in the most common applications on PCs and workstations. Many of the time slots are allocated to audio communication which is usually done with separate sound cards on most modern systems. Telephone communication primarily uses the audio slots to communicate telephone data or voice to Coder Decoder (CODEC) devices. CODEC devices, in general, comprise devices that encode (analog to digital) analog (data, audio, video, etc) signals to digital and decode (digital to analog) digital data back to respective analog signals. The Tag time slot in the AC-97 data frame is useable to signal an AC-97 controller to use or ignore information in data frame slots. With the addition of some logic and control signals in an AC-97 data communication controller, embodiments of the present invention enable devices other than AC-97 to be coupled to the AC-97 protocol data link, and AC-97 protocol and non-AC-97 protocol communication may be done concurrently using the AC-97 protocol link. Ethernet, HPNA, Attachment Unit Interface (AUI) are some but not all of the protocols that are possible using embodiments of the present invention.

The foregoing has outlined the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 3 an illustration of the AMR connector pin assignments;

DETAILED DESCRIPTION

Figure 1A:
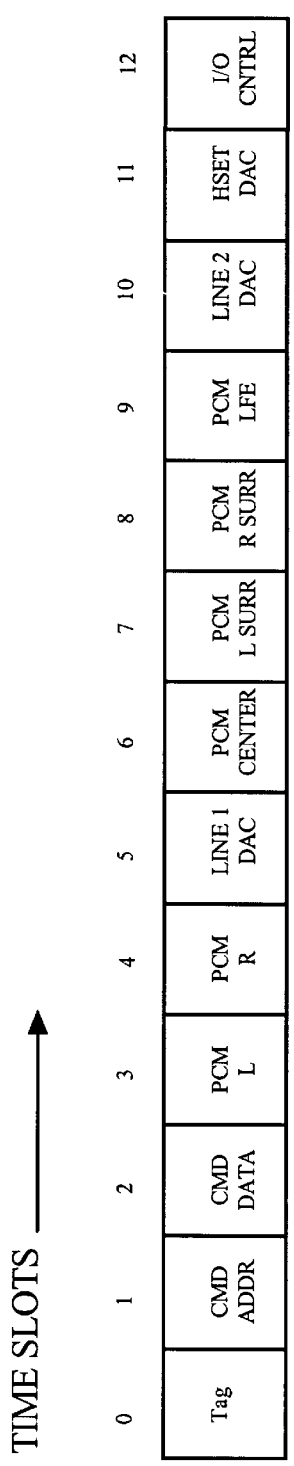
FIG. 1A illustrates the time slot allocations within a standard AC-97 data frame.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Figure 1B:
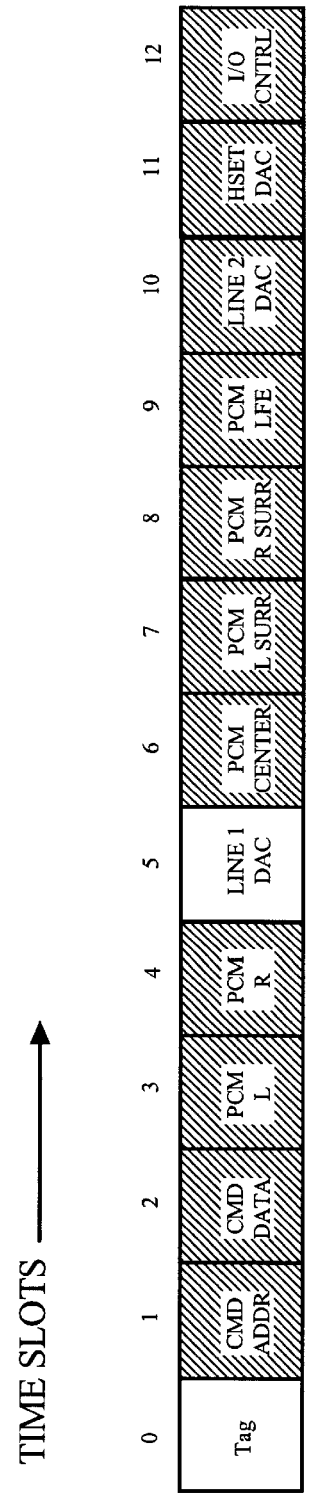
FIG. 1B illustrates the time slots used for an audio AC-97 data communication concurrent with an Ethernet data communication.

The frame clock for an AC-97 link runs at 48 KHz. An illustration of an AC-97 data frame is shown in FIG. 1A. There are 12 slots of 20 bits each for data transfer, either into or out of an AC-97 controller (not shown in FIG. 1A). A required feature of data communication, using embodiments of the present invention, is the enabling of simultaneous operation of a modem and an Ethernet connection. In FIG. 1B, Slot 5 in the AC-97 data frame carries telephone traffic which may be either voice or data. Most motherboard manufacturers use a separate data path for the sound card information, therefore no audio time slots in the AC-97 data frame would be used. In the case where a separate path is used for sound card information, eleven time slots remain open in the AC-97 data frame for other data communication traffic. The following calculation reveals that the maximum possible bandwidth, using embodiments of the present invention, would support a data rate of 10.56 Mbits/second (48 KHz frame rate×20 bits/slot×11 slots/frame). A data rate of 10.56 Mbits/second is fast enough for both HPNA version 1 and 2. If HPNA 1 is used, there is a sufficient bandwidth to also allow audio frames in the data path as well. In the standard AC-97 protocol data frame construction shown in FIG. 1A, control information is placed in the Tag Slot (Slot 0). Control information bits are used by the various AC-97 devices to indicate which device is receiving or transmitting data and if the Slot data, command address/data and full data frame are valid. There are several schemes possible in which these control bits may be used with the AC-97 protocol to keep AC-97 traffic separate (but still concurrent) with the data/Ethernet (non-AC-97 format) traffic in the other eleven slots. FIG. 1B illustrates an AC-97 data frame where only Slot 0 and Slot 5 are used to communicate to an AC-97 protocol audio device. The remaining eleven Slots (shown hatched) may then be used for communication with non-AC-97 protocol devices.

One embodiment of the present invention uses the AC-97 CODEC Identification (ID) format for the CODEC/Physical Layer (PHY) devices, so that the CODEC ID bits (not shown) in the Tag Slot will enable a desired CODEC while the remaining AC-97 devices will ignore the data stream. Using the CODEC ID bits in this manner requires a unique CODEC/PHY device that does not currently exist, however an existing device could be modified to give the desired function. In theory, if the CODEC ID does not match the one on the CODEC strapping pins (pins whose voltage potential may be used for selection purposes), the AC-97 device should ignore the command/data slots. This means that in some cases a new data device may not be necessary to implement a system using embodiments of the present invention. Additionally, the slot invalid bits may be set for all non-AC-97 slots which would force a CODEC to ignore the data slots thereby preserving data streams without corruption. Embodiments of the present invention may use additional control lines and logic in an AC-97 digital controller for the PHY device interfaces. The details concerning the use of additional control lines in the AC-97 specification are vague, however, extra control signals are allowed. Since additional control lines are possible, embodiments of the present invention enable a controller to be fully an AC-97 compliant while also maintaining full Ethernet/G.Lite capabilities up to 10 Mbit/sec. G.Lite is a digital communication protocol and method used with copper phone lines. Depending on the PHY used, many standard interfaces may be implemented (e.g., HPNA phone line, 10BaseT, 10Base2, AUI, etc.). One possible circuit for interconnecting multiple devices is shown in FIG. 2.

Figure 2:
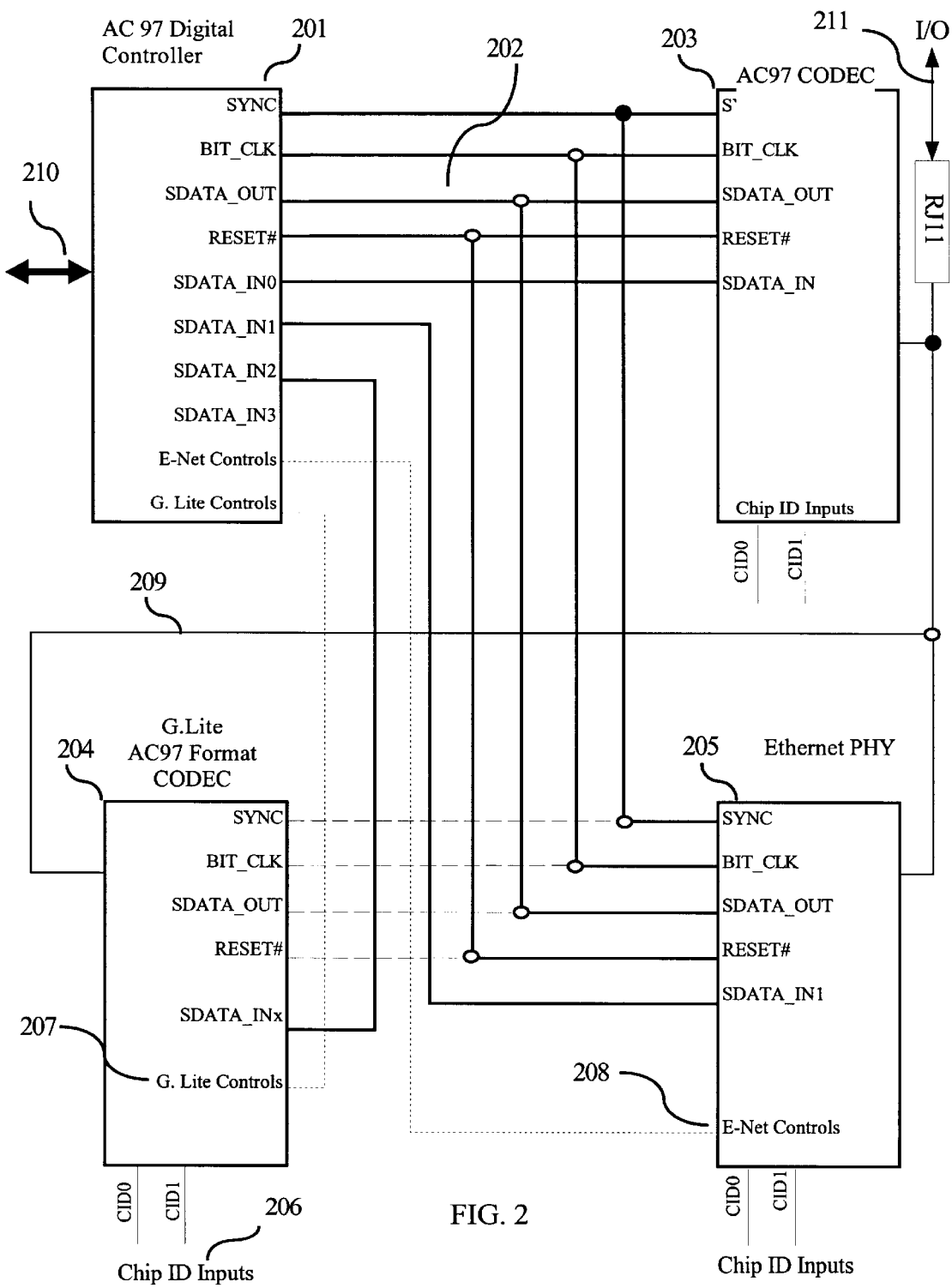
FIG. 2 a block diagram showing an AC-97 data controller, with AC-97 and non-AC-97 protocol devices coupled to the AC-97 data controller.

FIG. 2 illustrates the interconnection of an AC-97 digital controller 201, an AC-97 CODEC 203, a G.Lite CODEC 204, and an Ethernet PHY 205. The AC-97 digital controller 201 has multiple serial busses for receiving data from CODECs; these busses are SDATA_IN0, SDATA_IN1, SDATA_IN2 and SDATA_IN3. The AC-97 digital controller 201 sends data to all the CODECs on SDATA_Out. Additional control lines like E-Net Controls 208 and G.Lite Controls 207 are examples of control features used in embodiments of the present invention when interfacing AC-97 devices to G.Lite and Ethernet devices. Exemplary and optional CODEC ID inputs 206 are also shown on G.Lite CODEC 204. Multiple standard AC-97 interface lines 202 (Sync, Bit_Clk, SDATA_Out, Reset#, and SDATA_IN0) are shown coupling to all the devices controlled by AC-97 digital controller 201.

Input/Output (I/O) data, in embodiments of the present invention is coupled via an RJ11 connector to exemplary CODECs 203, 204 and 205 via lines 209. This I/O data comprises a mixed data signal to and from devices external to a system, for example, telephone, digital subscriber line (DSL), Ethernet and other. Since these signals operate at widely different frequencies, all the signals may be coupled together on a single line. Exemplary CODECs 203, 204 and 205 are intelligent in that they can "recognize" data formatted for their physical signal interface and their protocol. I/O data not meant for a particular CODEC is just ignored. If a CODEC, for example CODEC 204, recognizes incoming data, the data is received and decoded. CODEC 204 then formats the decoded data into AC-97 frames for communication over lines 202 to AC-97 controller 201 for communication to the system via system bus 210. System bus 210 is usually a Peripheral Component Interconnect (PCI) protocol bus. In embodiments of the present invention, data may be sent by a processor to multiple AC-97 and non-AC-97 devices. The digital controller may generate a frame of data that contains concurrently data for multiple CODECs. By using Tag bits in the AC-97 frame along with the Chip ID inputs it is possible to communicate to more than one CODEC concurrently using embodiments of the present invention. All the CODECs receive the digital data from the controller 201 on the common SDATA_Out line and use of Tag bits and Chip ID inputs determine which data slots within an AC-97 data frame is received by a particular device. After the CODECs receive selected data from the AC-97 data frames, the data is converted to the required signals for re-transmission back on the single I/O connector 211. If the digital controller 201 needs to communicate more complex control information, other control signals (e.g., E-Net Controls 208 and G. Lite Controls 207) may be used. The CODEC functions (G.Lite, Ethernet, and AC-97) shown in FIG. 2 may be implemented on individual cards or the functions may be implemented on individual chips on the same card.

The particular configuration of communication shown in FIG. 2 is determined by the particular AC-97 protocol interface presently in use. Other configurations may be possible and still be within the scope of embodiments of the present invention.

The AMR connector is ideal for added data connectivity needed when expanding the capabilities of present AC-97 data communication, using embodiments of the present invention, since it has multiple pins that are not currently used. For example, no manufacturers are currently using the Universal Serial Bus (USB) signals on the AMR connector. The AMR connector does have full AC-97 compliance, and it is used for AC-97 modems at the present time. Presently the AMR connector has seven reserved connections not currently implemented. These seven reserved connections may therefore be used for CODEC/PHY device signaling if necessary. The current pin out of the AMR connector is shown in FIG. 3. Since this is a system/motherboard resource, the software drivers to support AC-97 functionality are loaded onto the operating system by the OEM PC manufacturer. This means the end user does not need to make changes or set up the devices in the field. Since a customer does not have to make changes in the field one would expect fewer customer support calls for PC manufacturers using embodiments of the present invention.

Embodiments of the present invention also allow the leveraging of existing products giving them new applications. It also takes what is primarily a single function port (AC-97 through the AMR) and creates a new and useful function of digital data communications. The AMR port is a digital interface with analog components (for the modem) isolated for improved signal to noise performance. Embodiments of the present invention use the same approach when implementing G.Lite, Ethernet or any other data communication protocol in this bit rate range. The analog I/O of a CODEC may be isolated from the digital noise of the main system board which allows a single RJ11 jack connection to be used for an HPNA PHY device. One single jack to the outside world for all data connectivity, using a single RJ11 connection for example, is a feature that is desired by OEMs and provided by embodiments of the present invention. The method and system of embodiments of present invention offer a simple, cost-effective data communication solution that frees up system resources for the PC manufacturer, lowers customer support calls due to the system nature of the device, leverages existing architecture, and creates broader use for a previously single use standard interface connector.

Figure 4A:
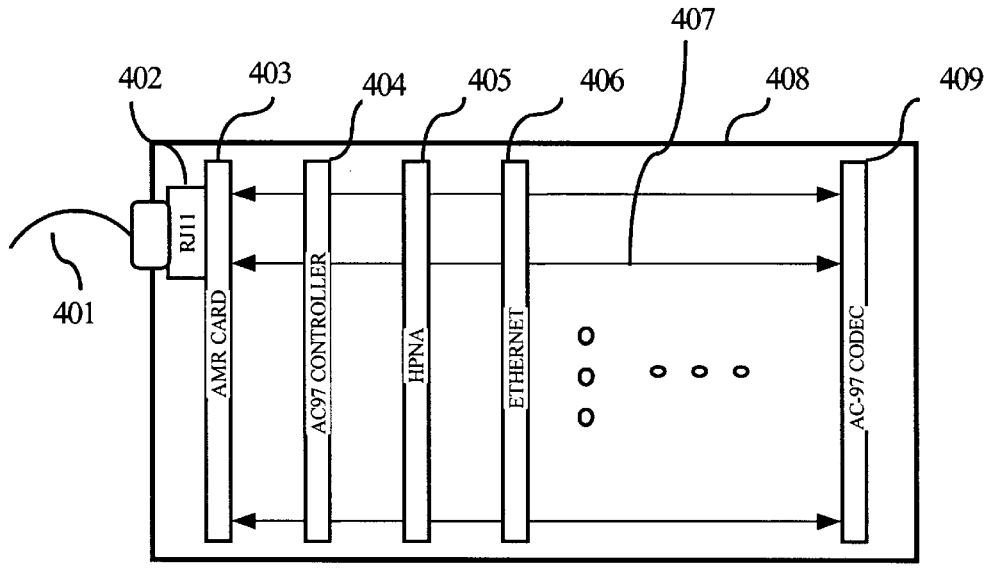
FIG. 4A is an illustration of a circuit board with AMR connectors coupling various devices to an AC-97 controller and to an RJ11 external connector.
Figure 4B:
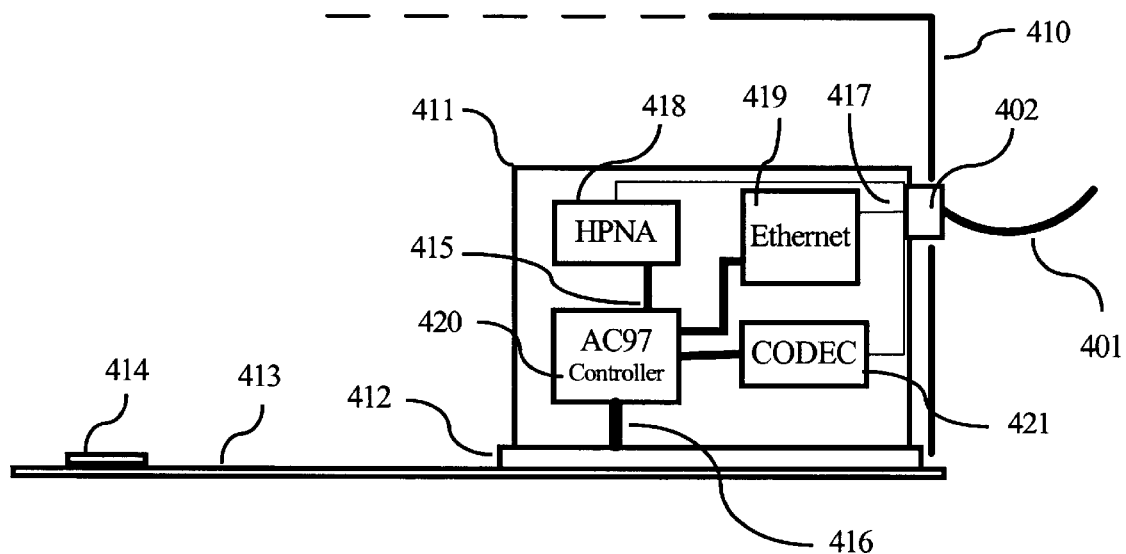
FIG. 4B is an illustration of an alternate method of coupling AC-97 and non-AC-97 CODECS on a system motherboard.

FIG. 4A illustrates one embodiment of the present invention where a motherboard 408 along with a input cable 401 connects external devices (not shown) to an AMR card 403 via a RJ11 402 connector. Lines 407 couple to the various other cards, AC-97 controller 404, HPNA 405, ETHERNET 406 and AC-97 CODEC 409. The motherboard 408, in embodiments of the present invention would also couple the AC-97 controller to a processor using a PCI or other system bus. These various cards may be coupled to lines 407 using the AMR connector pin out. FIG. 4B is another embodiment of the present invention where a motherboard 413 contains system components like an illustrative processor chip 414. An AMR card 411, in this embodiment of the present invention, has an HPNA CODEC chip 418, an Ethernet chip 419, an AC-97 controller chip 420 and an AC-97 CODEC chip 421. These CODEC chips are coupled external to the motherboard via lines 417 and single RJ11 connector 402 and cable 401. The cover of a personal computer or workstation housing the card 411 and the motherboard 413 is illustrated by 410. RJ11 connector 402 is shown accessible through a hole in cover 410. The CODEC chips, in FIG. 4B, are coupled via AC-97 connections 416 and the AC-97 controller couples to the system (e.g., processor chip 414) via an AMR connector 412. In the embodiment of FIG. 4B, all the various CODEC chips are integrated onto one AMR card 411 greatly reducing space within the system employing the illustrative motherboard 413. The integration made possible using embodiments of the present invention reduces costs and gives system designers a single system input to several different protocol CODECs.

Figure 5:
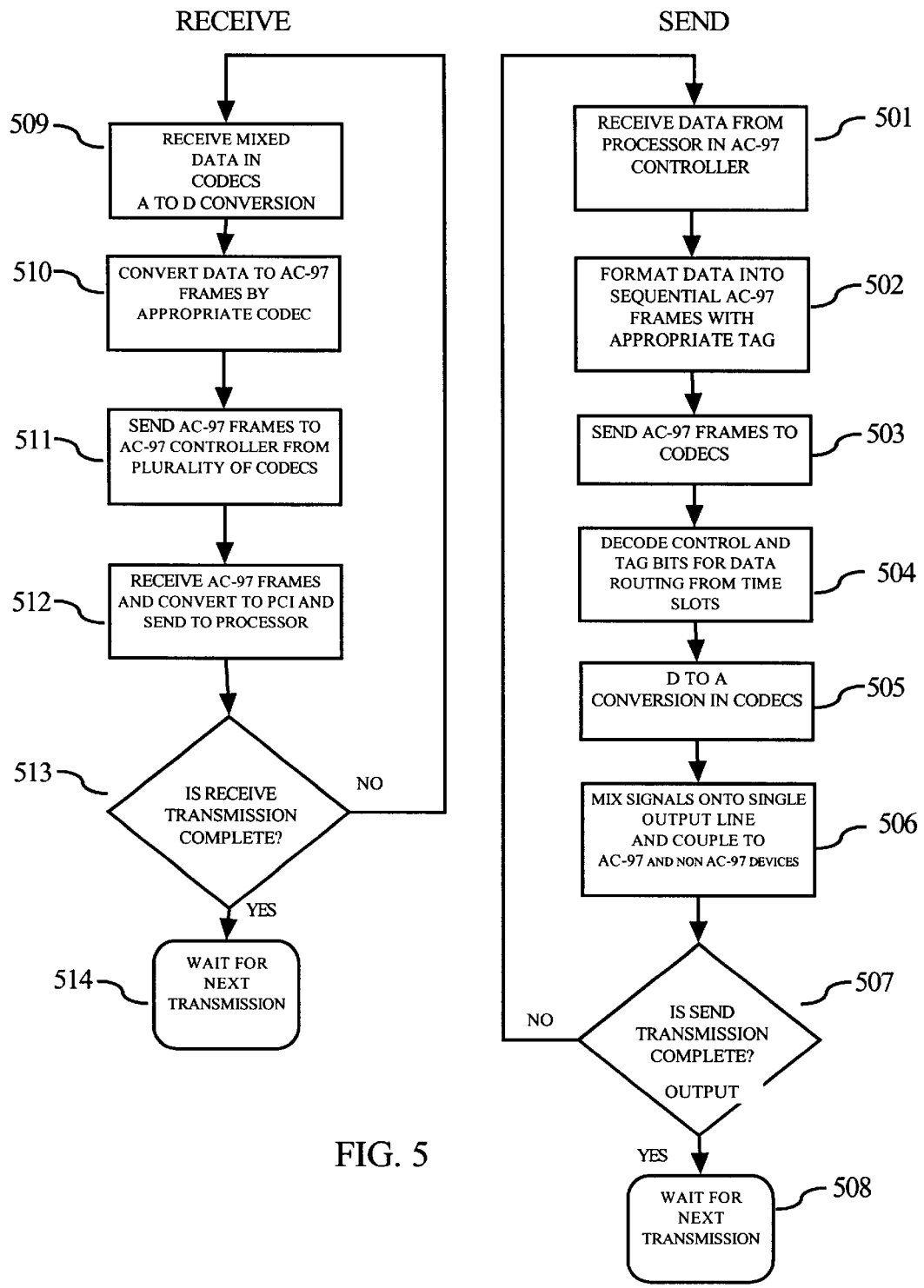
FIG. 5 is a flow diagram of steps used in embodiments of the present invention.

FIG. 5 is a flow diagram of steps used in embodiments of the present invention. FIG. 5 illustrates the bi-directional modes of sending and receiving data over the AC-97 link. In the send mode, a processor is sending data to external devices and in the receive mode the external devices are sending data to the processor. In step 509, data from devices external to a system is received via a RJ11 connector and distributed to CODECs. In step 510, the data is converted to AC-97 frames by appropriate CODECs and in step 511 the data is sent to an AC-97 controller. In step 512, the data is sent to the processor over a PCI bus. If the data transmission is not complete then a return is issued in step 513 to continue data reception. If the data reception is complete a wait is issued in step 514 awaiting a next transmission.

The AC-97 link is bi-directional and the method for sending data concurrently to multiple AC-97 and non-AC-97 devices is shown in steps 501 through 508. In step 501, data for concurrent transmission to multiple CODECs is received from a processor by an AC-97 controller. The data is formatted into sequential AC-97 data frames with appropriate Tag bits in step 502. The AC-97 data frames, in step 502, may have data for multiple devices in a single data frame. The AC-97 data frames are sent concurrently to all the CODECs in step 503. The control data and Tag data is decoded in step 504 to enable particular CODECs to receive selected time slot data from AC-97 data frames. In step 505, the CODECs convert the data to their appropriate analog signals. In step 506, the data from the CODECs is mixed onto a single output line and coupled to AC-97 and non-AC-97 devices. A test for transmission complete is done in step 507. If the transmission is complete, a wait is issued awaiting the next transmission in step 508. If the transmission is not complete, a return to step 501 is issued to process additional data for transmission.

Figure 6:
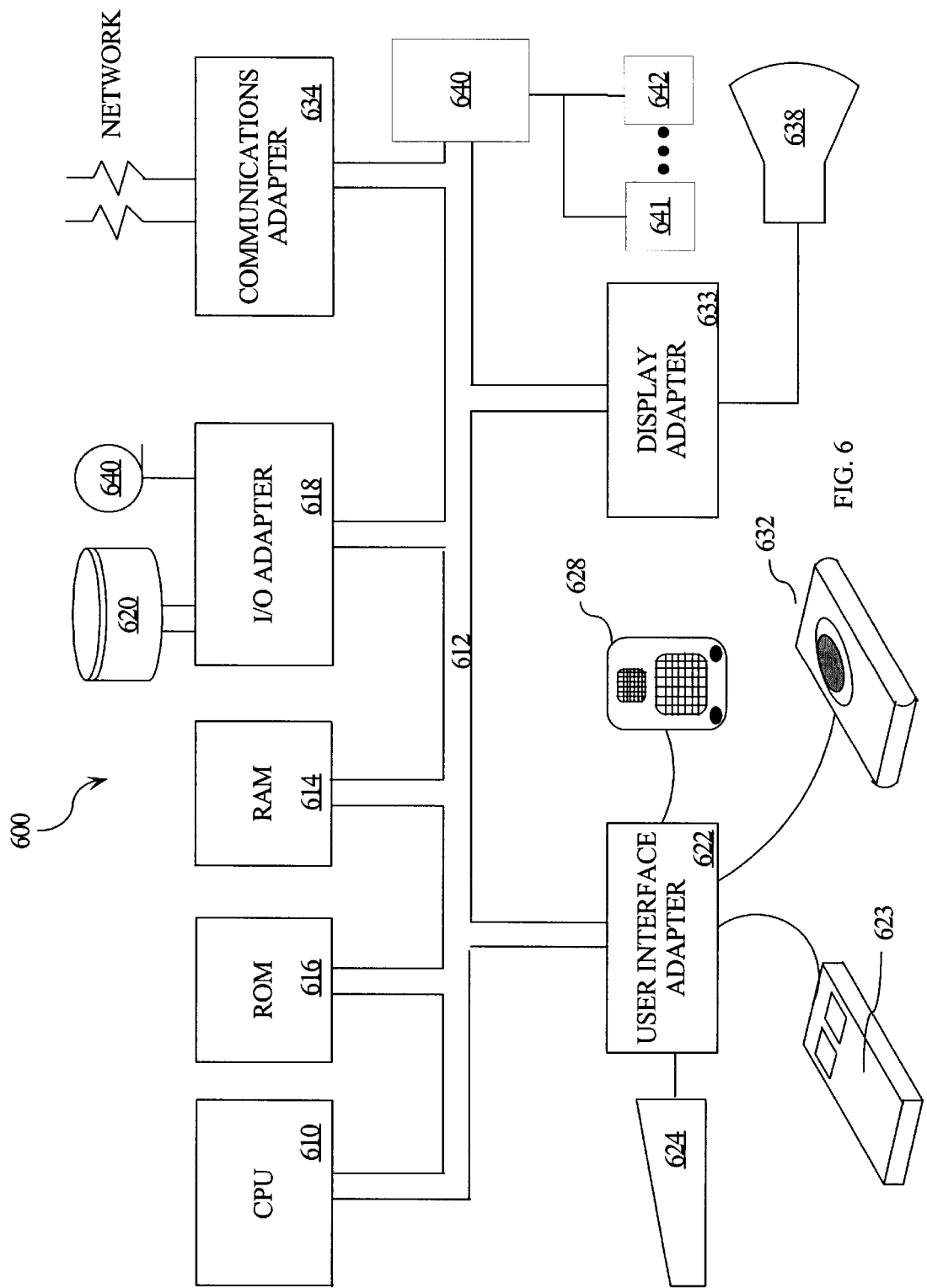
FIG. 6 is an illustration of a data processing system suitable for use with embodiments of the present invention.

Referring to FIG. 6, an example is shown of a data processing system 600 which may be used for the invention. The system has a central processing unit (CPU) 610, which is coupled to various other components by system bus 612. Read-only memory ("ROM") 616 is coupled to the system bus 612 and includes a basic input/output system ("BIOS") that controls certain basic functions of the data processing system 600. Random access memory ("RAM") 614, I/O adapter 618, and communications adapter 634 are also coupled to the system bus 612. I/O adapter 618 may be a small computer system interface ("SCSI") adapter that communicates with a disk storage device 620. Communications adapter 634 interconnects bus 612 with an outside network enabling the data processing system to communicate with other such systems. Input/Output devices are also connected to system bus 612 via user interface adapter 622 and display adapter 636. Keyboard 624, track ball 632, mouse 623, speaker 628 and fiscal printer 641 are all interconnected to bus 612 via user interface adapter 622. Display monitor 638 is connected to system bus 612 by display adapter 636. In this manner, a user is capable of inputting to the system through the keyboard 624, trackball 632, or mouse 623, and receiving output from the system via speaker 628, and display 638. A user may send and receive data using an AC-97 data communication system 640. Exemplary external devices 641 and 642 may be non-AC-97 protocol or AC-97 protocol devices according to embodiments of the present invention. AC-97 data communication system 640 may employ AC-97 data frames modified according to embodiments of the present invention, to communicate between a processor such as processor 610 and AC-97 and non-AC-97 protocol devices concurrently on an AC-97 data link.

Although the present invention and its advantages have been described in detail, it should be understood that various changes, substitutions and alterations can be made herein without departing from the spirit and scope of the invention as defined by the appended claims.

What is claimed is:

1. A data communication method within a standard AC-97 protocol link comprising the method steps of:
 coupling non-AC-97 (protocol) encoding and decoding devices (CODECs) onto an AC-97 protocol link to an AC-97 controller, said AC-97 controller coupled to a system processor via a system bus, coupling signal data from non-AC-97 devices to said non-AC-97 CODECs;
 receiving and decoding selected data from said signal data by said non-AC-97 CODECs and encoding said received and decoded signal data into concurrent AC-97 data frames by each CODEC receiving selected signal data; and
 sending said selected encoded data in said concurrent AC-97 data frames via said AC-97 protocol link to said AC-97 data controller.

2. The data communication method of claim 1 further comprising the steps of:
 encoding non-AC-97 data by said AC-97 controller into selected single or selected multiple sequential AC-97 data frames with modified data frame Tag bits;
 coupling said selected AC-97 data frames concurrently to said non-AC-97 CODECs;
 receiving, by said non-AC-97 CODECs, selected frame data from said selected single or multiple sequential AC-97 data frames in response to said Tag bits and CODEC chip indicator bits; and
 encoding to non-AC-97 signal data said received selected frame data by said non-AC-97 CODECs and coupling said encoded signal data to said non-AC-97 devices;
 wherein said non-AC-97 devices concurrently communicate to a system processor over said AC-97 protocol link.

3. The data communication method of claim 2, wherein said AC-97 communication controller contains interface logic circuits operable to generate additional control signals for non-AC-97 protocol devices said additional control signals not contained in said AC-97 data frames.

4. The data communication method of claim 2, wherein said non-AC-97 CODECs are coupled to said AC-97 protocol link via an Audio Modem Riser (AMR) connector.

5. The data communication method of claim 2, wherein said non-AC-97 CODECs are integrated circuits (ICs) coupled to said AC-97 controller on a single card via said AC-97 protocol link.

6. A data communication method within a standard AC-97 protocol link comprising the method steps of:
 coupling AC-97 and non-AC-97 (protocol) encoding and decoding devices (CODECs) onto an AC-97 protocol link to an AC-97 controller, said AC-97 controller coupled to a system processor via a system bus;
 coupling signal data from AC-97 and non-AC-97 devices to said AC-97 and non-AC-97 CODECs;
 receiving and decoding selected data from said signal data by said AC-97 and non-AC-97 CODECs and encoding said received and decoded signal data into concurrent AC-97 data frames by each CODEC receiving selected signal data; and
 sending said selected encoded data in said concurrent AC-97 data frames via said AC-97 protocol link to said AC-97 data controller.

7. The data communication method of claim 6 further comprising the steps of:
 encoding AC-97 and non-AC-97 data by said AC-97 controller into selected single or selected multiple sequential AC-97 data frames with modified data frame Tag bits;
 coupling said selected AC-97 data frames concurrently to said AC-97 and non-AC-97 CODECs;
 receiving, by said AC-97 and non-AC-97 CODECs, selected frame data from said selected single or multiple sequential AC-97 data frames in response to said Tag bits and CODEC chip indicator bits; and
 encoding to AC-97 and non-AC-97 signal data, said received selected frame data by said AC-97 and non-AC-97 CODECs and coupling said encoded signal data to said AC-97 and non-AC-97 devices;
 wherein said AC-97 and non-AC-97 devices concurrently communicate to a system processor over said AC-97 protocol link.

8. The data communication method of claim 7, wherein said AC-97 communication controller contains interface logic circuits operable to generate additional control signals for non-AC-97 protocol devices said additional control signals not contained in said AC-97 data frames.

9. The data communication method of claim 7, wherein said AC-97 and non-AC-97 CODECs are coupled to said AC-97 protocol link via an Audio Modem Riser (AMR) connector.

10. The data communication method of claim 7, wherein said AC-97 and non-AC-97 CODECs are integrated circuits (ICs) coupled to said AC-97 controller on a single card via said AC-97 protocol link.

11. The data communication method of claim 2, wherein said signal data from said non-AC-97 devices are mixed onto a single input cable, said single cable coupling to each of said non-AC-97 CODECs.

12. The data communication method of claim 6, wherein said signal data from said AC-97 and said non-AC-97 devices are mixed onto a single input cable, said single cable coupling to each of said AC-97 or non-AC-97 CODECs.

13. The data communication method of claim 11, wherein said single input cable is coupled to said non-AC-97 CODECs via an RJ11 connector.

14. The data communication method of claim 12, wherein said single input cable is coupled to said AC-97 and non-AC-97 CODECs via an RJ11 connector.

15. An AC-97 controller, said AC-97 controller operable to send and receive data from non-AC-97 via non-AC-97 CODECs over a standard AC-97 link using AC-97 data frames.

16. The AC-97 controller of claim 15, wherein said AC-97 data frames comprise control information for said non-AC-97 device data is encoded in Tag bits in slot zero of said AC-97 data frame.

17. The AC-97 controller of claim 16, said AC-97 controller operable to send control information to non-AC-97 CODECs not in said Tag data.

18. The AC-97 controller of claim 15, wherein said AC-97 controller is operable to send AC-97 data frames to said non-AC-97 CODECs on said standard AC-97 link, said AC-97 data frames comprising data for multiple non-AC-97 devices concurrently within single ones of said AC-97 data frames.

19. The AC-97 controller of claim 15, wherein said AC-97 controller is operable to send AC-97 data frames to said non-AC-97 CODECs on said standard AC-97 link, said AC-97 data frames comprising data for multiple non-AC-97 devices, said data for multiple non-AC-97 devices concurrently within single ones of said AC-97 data frames, interleaved within sequential ones of said AC-97 data frames or within a combination of single ones or interleaved sequential ones of said AC-97 data frames.

20. An AC-97 controller, said AC-97 controller operable to send and receive data from AC-97 and non-AC-97 devices via AC-97 and non-AC-97 CODECs over a standard AC-97 link using AC-97 data frames.

21. The AC-97 controller of claim 20, wherein said AC-97 data frames comprise control information for said AC-97 and non-AC-97 device data encoded in Tag bits in slot zero of said AC-97 data frame.

22. The AC-97 controller of claim 21, said AC-97 controller operable to send control information to AC-97 and non-AC-97 CODECs not in said Tag data.

23. The AC-97 controller of claim 20, wherein said AC-97 controller is operable to send AC-97 data frames to said AC-97 and non-AC-97 CODECs on said standard AC-97 link, said AC-97 data frames comprising data for multiple AC-97 and non-AC-97 devices concurrently within single ones of said AC-97 data frame.

24. The AC-97 controller of claim 20, wherein said AC-97 controller is operable to send AC-97 data frames to said AC-97 and non-AC-97 CODECs on said standard AC-97 link, said AC-97 data frames comprising data for multiple AC-97 and non-AC-97, said data for multiple AC-97 and non-AC-97 devices concurrently within single ones of said AC-97 data frames, interleaved within sequential ones of said AC-97 data frames or within a combination of single ones or interleaved sequential ones of said AC-97 data frames.

25. A data communication system using an AC-97 protocol link comprising:

an AC-97 protocol controller, said AC-97 protocol controller operable to send and receive non-standard AC-97 data frames over an AC-97 protocol link;

non-AC-97 protocol encoder and decoder (CODEC) devices coupled to said AC-97 protocol controller via said AC-97 protocol link, said CODEC devices operable to receive compatible selected data from AC-97 data frames in response to Tag bits and chip identification (ID) bits and operable to receive compatible selected signal data from non-AC-97 devices; and non-AC-97 protocol devices coupled to said non-AC-97 CODECs, wherein said non-AC-97 protocol devices concurrently communicate to a system processor over said AC-97 protocol link.

26. The data communication system of claim 25, wherein said non-AC-97 protocol devices are coupled to said AC-97 protocol controller via an Audio Modem Riser (AMR) card.

27. The data communication system of claim 25, wherein said AC-97 protocol controller contains interface logic circuits operable to generate additional control signals for non-AC-97 protocol devices said additional control signals not contained in said data frame.

28. The data communication system of claim 25, wherein said non-AC-97 protocol CODEC devices are coupled to said AC-97 protocol controller with connectors on said AMR card.

29. The data communication method of claim 25, wherein non-AC-97 protocol CODEC devices are integrated circuits (ICs) coupled to said AC-97 protocol controller on a single card via an AC-97 protocol link.

30. A data communication system using an AC-97 protocol link comprising:

an AC-97 protocol controller, said AC-97 protocol controller operable to send and receive non-standard AC-97 data frames over an AC-97 protocol link, AC-97 and non-AC-97 protocol encoder and decoder (CODEC) devices coupled to said AC-97 protocol controller via said AC-97 protocol link, said CODEC devices operable to receive compatible selected data from AC-97 data frames in response to Tag bits and chip identification (ID) bits and operable to receive compatible selected signal data from AC-97 and non-AC-97 devices, and AC-97 and non-AC-97 protocol devices coupled to said AC-97 and non-AC-97 CODECs, wherein said AC-97 and non-AC-97 protocol devices concurrently communicate to a system processor over an AC-97 protocol link.

31. The data communication system of claim 30, wherein said AC-97 and non-AC-97 protocol devices are coupled to said AC-97 protocol controller via an Audio Modem Riser (AMR) card.

32. The data communication system of claim 30, wherein said AC-97 protocol controller contains interface logic circuits operable to generate additional control signals for AC-97 and non-AC-97 protocol devices said additional control signals not contained in said data frame.

33. The data communication system of claim 30, wherein said AC-97 and non-AC-97 protocol CODEC devices are coupled to said AC-97 protocol controller with connectors on said AMR card.

34. The data communication system of claim 30, wherein AC-97 and non-AC-97 protocol CODEC devices are integrated circuits (ICs) coupled to said AC-97 protocol controller on a single card via an AC-97 protocol link.

35. A data processing system, comprising:

a central processing unit (CPU);

shared random access memory (RAM);

read only memory (ROM);

an I/O adapter;

a display adapter;

a display;

a user interface adapter; and a data communication system coupling AC-97 protocol devices and non-AC-97 protocol devices, said data communication system comprising:
- an AC-97 protocol controller, said AC-97 protocol controller operable to send and receive non-standard AC-97 data frames over an AC-97 protocol link;
- non-AC-97 protocol encoder and decoder (CODEC) devices coupled to said AC-97 protocol controller via said AC-97 protocol link, said CODEC devices operable to receive compatible selected data from AC-97 data frames in response to Tag bits and chip identification (ID) bits and operable to receive compatible selected signal data from non-AC-97 devices; and
- non-AC-97 protocol devices coupled to said non-AC-97 CODECs,
- wherein said non-AC-97 protocol devices concurrently communicate to a system processor over an AC-97 protocol link.

36. The data processing system of claim 35, wherein said non-AC-97 protocol devices are coupled to said AC-97 protocol controller via an Audio Modem Riser (AMR) card.

37. The data processing system of claim 35, wherein said AC-97 protocol controller contains interface logic circuits operable to generate additional control signals for non-AC-97 protocol devices said additional control signals not contained in said data frame.

38. The data processing system of claim 35, wherein said non-AC-97 protocol CODEC devices are coupled to said AC-97 protocol controller with connectors on said AMR card.

39. The data processing system of claim 35, wherein non-AC-97 protocol CODEC devices are integrated circuits (ICs) coupled to said AC-97 protocol controller on a single card via an AC-97 protocol link.

40. A data processing system, comprising:

a central processing unit (CPU);

shared random access memory (RAM);

read only memory (ROM);

an I/O adapter;

a display adapter;

a display;

a user interface adapter; and a data communication system coupling AC-97 protocol devices and non-AC-97 protocol devices, said data communication system comprising:
- an AC-97 protocol controller, said AC-97 protocol controller operable to send and receive non-standard AC-97 data frames over an AC-97 protocol link;
- AC-97 and non-AC-97 protocol encoder and decoder (CODEC) devices coupled to said AC-97 protocol controller via said AC-97 protocol link, said CODEC devices operable to receive compatible selected data from AC-97 data frames in response to Tag bits and chip identification (ID) bits and operable to receive compatible selected signal data from AC-97 and non-AC-97 devices; and
- AC-97 and non-AC-97 protocol devices coupled to said AC-97 and non-AC-97 CODECs,
- wherein said AC-97 and non-AC-97 protocol devices concurrently communicate to a system processor over an AC-97 protocol link.

41. The data processing system of claim 24, wherein said AC-97 and non-AC-97 protocol devices are coupled to said AC-97 protocol controller via an Audio Modem Riser (AMR) card.

42. The data processing system of claim 24, wherein said AC-97 protocol controller contains interface logic circuits operable to generate additional control signals for AC-97 and non-AC-97 protocol devices said additional control signals not contained in said data frame.

43. The data processing system of claim 8, wherein said AC-97 and non-AC-97 protocol CODEC devices are coupled to said AC-97 protocol controller with connectors on said AMR card.

44. The data processing system of claim 8, wherein AC-97 and non-AC-97 protocol CODEC devices are integrated circuits (ICs) coupled to said AC-97 protocol controller on a single card via an AC-97 protocol link.

* * * * *

UNITED STATES PATENT AND TRADEMARK OFFICE
CERTIFICATE OF CORRECTION

PATENT NO. : 6,801,541 B1
DATED : October 5, 2004
INVENTOR(S) : Timothy C. Maleck It is certified that error appears in the above-identified patent and that said Letters Patent is hereby corrected as shown below:

Column 7,
Line 44, following "bus" please replace "," with -- ; --.
Line 44, please insert a new line before "coupling".

Column 10,
Line 33, following "link" please replace "," with -- ; --.
Line 41, following "devices" please replace "," with -- ; --.

Signed and Sealed this

Twenty-eighth Day of December, 2004

JON W. DUDAS
*Director of the United States Patent and Trademark Office*